Figure 1:
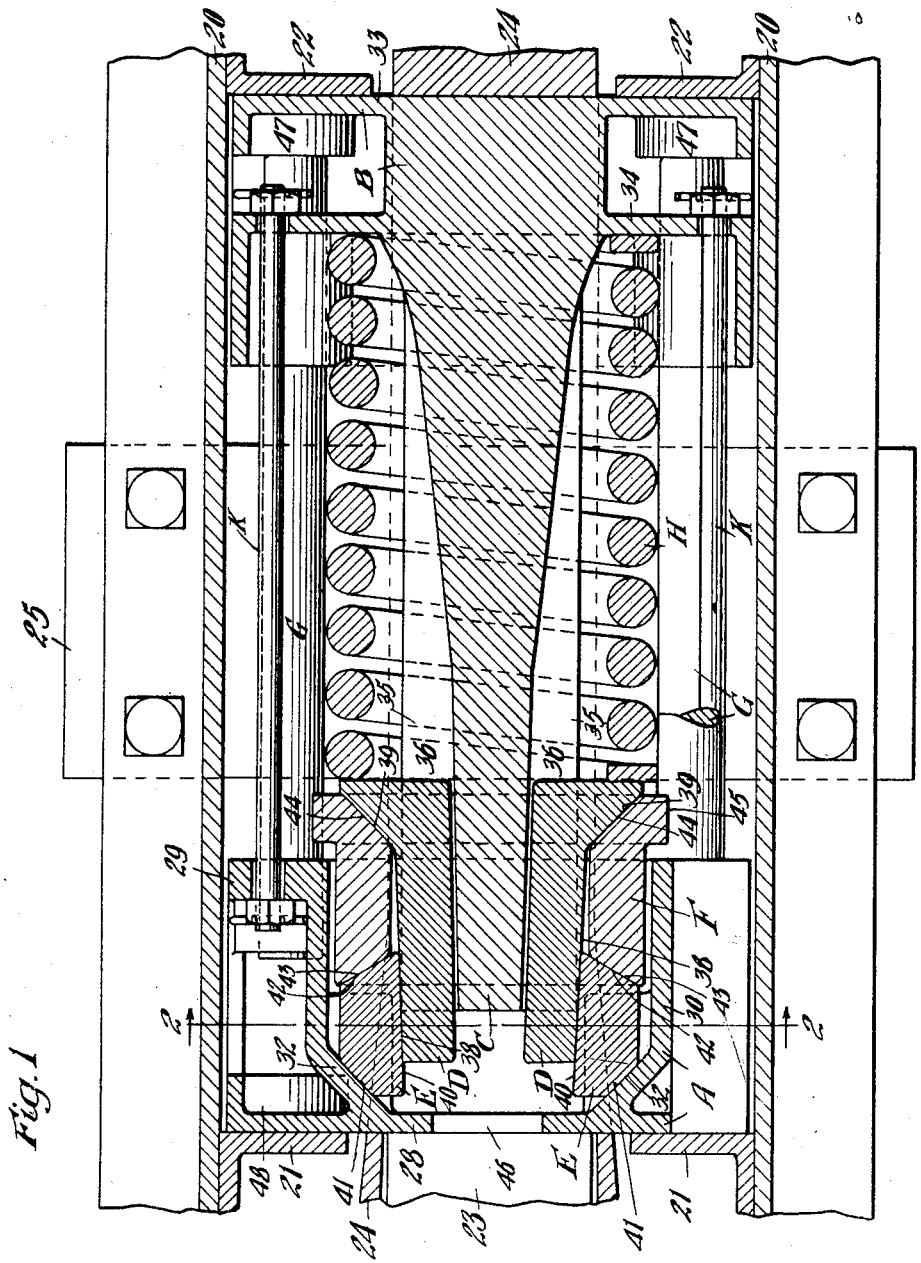

Aug. 14, 1928.  
S. B. HASELTINE  
1,680,612  
FRICTION SHOCK ABSORBING MECHANISM  
Original Filed Sept. 26, 1923     2 Sheets-Sheet 1

Witnesses  
Wm. Geiger

Inventor  
Stacy B. Haseltine  
By George I. Haight  
His Atty.

Aug. 14, 1928.

S. B. HASELTINE 1,680,612

FRICTION SHOCK ABSORBING MECHANISM

Original Filed Sept. 26, 1923   2 Sheets-Sheet 2

Witnesses
Wm. Geiger

Inventor
Stacy B Haseltine
By George J. Haight
His Atty.

Patented Aug. 14, 1928.

1,680,612

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed September 26, 1923, Serial No. 664,867. Renewed December 27, 1927.

This invention relates to improvements in friction shock absorbing mechanisms.

The object of the invention is to provide a friction shock absorbing mechanism, including a central friction post and a wedge pressure transmitting means, wherein is obtained high frictional capacity combined with assured release, the arrangement being such that a high frictional capacity is developed during compression by a system of relatively blunt and keen angle wedge and friction elements.

Other objects and advantages of the invention will more clearly appear from the description and claims hereinafter following.

In the drawings, forming a part of this specification, Fig. 1 is a longitudinal, sectional view of a part of a railway draft rigging, illustrating the preferred form of my improvements in connection therewith, the section through the follower, friction elements and other parts corresponding to two section planes at approximately 120° apart. Fig. 2 is a vertical, transverse, sectional view corresponding substantially to the line 2—2 of Fig. 1. Fig. 3 is a front elevational view of a wedge ring used in connection with the mechanism shown in Figs. 1 and 2. And Figs. 4 to 11 inclusive are longitudinal, sectional views of a portion of the front follower and elements associated therewith, at one side of the longitudinal center line of the mechanism, each view showing a different embodiment of the invention.

In the drawings, 20—20 indicate the usual draft center sills of a car underframe, said sills being preferably of channel cross-section, and to the inner faces of which are secured front stop lugs 21—21 and rear stop lugs 22—22, of usual construction. A portion of the draw-bar is indicated at 23, the same having operatively associated therewith a hooded cast yoke 24 of well known form, and within which is disposed the shock absorbing mechanism proper, hereinafter described. The yoke and parts contained therein are supported in operative position by a detachable saddle plate 25.

Referring first, to the preferred form of the invention illustrated in Figs. 1, 2 and 3 of the drawings the improved shock absorbing mechanism proper comprises a combined front follower and wedge casting A; the rear follower casting B; a friction post C; three friction shoes D—D; three wedge blocks E—E; a wedge ring F; four stop members G—G; a spring resistance H; and a pair of retainer bolts K.

The combined front follower and wedge casting A is of hollow construction and comprises, a top wall 26; a bottom wall 27; a front wall 28; a rear wall 29; and three longitudinally arranged walls 30 extending from the front wall 28 to the rear wall 29, the said walls 30 being connected by curved web portions 31 and defining a casing in which the wedge friction shoes are housed. As clearly shown in Fig. 2, the walls 30 are arranged symmetrically about the axis of the gear and are provided at the front ends thereof with interior, rearwardly, diverging flat faces 32 extending at a relatively keen angle with reference to the longitudinal axis of the gear as shown in Fig. 1. The front wall 28 of the casting A is adapted to abut the front stop lugs 21 and coact therewith in a well known manner.

The rear follower casting B is of generally rectangular outline and has integrally formed therewith the friction post C. The follower B is provided with a rear wall 33 adapted to co-act with the rear stop lugs 22, and a spaced web 34 laterally projecting from the rear end of the post C and extending parallel to the rear wall 33 of the follower.

The friction post C is provided at the forward end thereof with three equally spaced, laterally projecting arms 35 thereby providing three longitudinally extending V-shaped friction surfaces 36, which diverge slightly in a direction toward the rear of the mechanism.

The three friction shoes D—D, preferably in the form of castings, are of like construction, each having a V-shaped inner friction surface 37 adapted to co-act with one of the V-shaped friction surfaces 36 of the post C. At the outer side, each friction shoe D is provided with a face 38 slightly inclined rearwardly and outwardly with respect to the V-shaped surface 37 thereof. At the rear end portion beyond the face 38 each friction shoe D is provided with a rearwardly and outwardly inclined face 39 extending at a relatively keen angle with reference to the longitudinal axis of the mechanism.

The three wedge blocks E, preferably in the form of castings, are of like construction, each having a flat inner side face 40, a flat wedge face 41 at the front end thereof, correspondingly inclined to the face 32 of the follower A, and a flat wedge face 42 at the rear end thereof rearwardly converging and extending at a relatively blunt angle with reference to the longitudinal axis of the mechanism. Each of the wedge blocks E is interposed between one of the side walls 30 of the follower A, and one of the shoes D, with the flat face 40 thereof engaging the face 38 of the shoe and the wedge face 41 engaging the adjacent face 32 of the follower A.

The wedge ring F surrounds the friction shoes D and is interposed between the faces 39 of the latter and the rear ends of the wedge blocks E and is provided with three circumferentially spaced flat faces 43 at the front side thereof, each inclined similarly to a face 42 at the rear end of one of the blocks E and adapted to co-act therewith, and three circumferentially spaced flat faces 44 at the rear end thereof, each inclined correspondingly to the face 39 of one of the shoes D and adapted to co-act therewith. The ring F is also provided with a laterally projecting circumferential flange 45 at the rear end thereof, the same being slightly spaced rearwardly of the wall 29 of the follower A, for a purpose hereinafter described.

The spring resistance H is interposed between the web 34 of the rear follower B and the wedge friction shoes D, having the front end thereof directly abutting the rear ends of the shoes.

The stop members G are four in number, extending longitudinally of the mechanism and are located at the corners of the followers being slidably mounted between bosses 47 on the rear follower B and the bosses 48 on the front follower A and extending loosely through alined recesses in the web 34 and the rear wall 29 of the front follower A. The stop members G are of such a length that the front ends thereof are adapted to abut the bosses 47 and 48 of the rear and front followers respectively, to limit the relative inward movement of the follower when the gear is fully compressed, thereby forming in effect stop columns by which the excess pressure is transmitted directly from the front follower to the rear follower. In this connection it will be noted that the front wall 28 of the follower A is recessed as indicated at 46 to receive the front end of the post C and permit the front wall of the follower A to pass inwardly beyond the outer end of the post when the gear is fully compressed, the recess 46 corresponding in outline to the cross-section of the outer end of the post and loosely accommodating the same.

The retainer bolts K are two in number arranged on opposite sides of the gear, midway of its height, each bolt having the rear end thereof anchored to the web 34 of the rear follower casting B and its front end anchored to the wall 29 of the front follower casting A.

The operation of the device shown in Figs. 1, 2 and 3 is as follows, assuming a compression stroke of the mechanism. As the front follower is forced inwardly of the gear, a wedging action will be set up between the wedge faces 32 of the follower A and the wedge faces 41 of the wedge blocks E, and between the wedge faces 44 of the ring F and the wedge faces 39 of the shoes D, the ring being forced rearwardly substantially in unison with the block E during the initial action on account of the blunt and relatively non-wedging angle of the faces 42 and 43 of the block E and the ring F. It will be evident that rearward movement of the shoes D will be resisted by the spring H during this action. As the parts continue their movement inwardly, the shoes D will slide on the V-shaped friction faces of the post C, and will be gradually separated due to the taper of the friction post, also effecting a gradual slight separation of the wedge blocks E, thereby setting up a differential wedge action, the faces 41 and 42 of the blocks E slipping on the faces 32 and 43 of the follower A and the wedge ring F respectively, and the faces 39 of the shoes D slipping on the faces 44 of the ring F causing a rearward movement of the shoes D relatively to the wedge blocks E and the follower A and, thereby, effecting an additional rearward movement of the shoes D on the post C. This causes a further compression of the spring H. A slight clearance is left between the side walls 30 of the follower A and the wedge blocks E and between the shoes D and the ring F to permit of the necessary lateral movement of the shoes and wedge blocks relatively to the ring and follower respectively.

Upon removal of the compression force initial releasing action takes place on the faces 32 and 41 of the follower A and the wedge blocks E the follower falling away from the blocks due to the bluntness of the contacting faces; the pressure on the outer end of wedges E being thereby removed, the latter members on account of the blunt angle included between faces 40 and 42 thereof, relieve themselves from contact with shoes D and ring F, and the whole wedging structure collapses, thereby reducing the pressure on the wedge shoes D permitting the spring to move the shoes, ring and wedge blocks outwardly to restore all the parts to normal position.

As wear occurs on the different faces, compensation therefor is had by the shoes E and the ring F moving forwardly, the spring being placed under initial compression when the parts are assembled to assure of this movement, the clearance between the flange 45 of the ring and the rear wall of the follower being left to permit forward movement of the ring. The over-all length of the mechanism is maintained substantially constant by the bolts K.

In the different modifications shown in Figs. 4 to 11 inclusive, various arrangements of wedges, wedge shoes and rings are illustrated, associated with a front follower and a post of the character shown in Figs. 1 and 2, the remaining co-operating parts of the mechanism, which are in all respects similar to that shown in Fig. 1 not being shown in these figures.

Referring first to the form of the invention illustrated in Fig. 4, the mechanism shown therein comprises, a front follower A; a friction post C'; three wedge friction shoes D'; three wedge blocks E'; a wedge ring F'; and a spring follower ring M'. The follower A' is provided with a front wall 128, a rear wall 129, side walls 130 and wedge faces 132, and the post C' is provided with arms 135 and V-shaped friction surfaces 136, said parts being in all respects similar to the corresponding parts shown in Fig. 1, there being three wedge faces 132 on the shell and three arms 135 on the post C'.

Interposed between each of the side walls of the follower A' and the post C' is a friction shoe D' having at its outer side a rearwardly extending face 140 disposed at a relatively keen angle with reference to the longitudinal axis of the mechanism, a flat outer face 141 at the front end correspondingly inclined to and adapted to co-act with one of the faces 132 of the follower, and a flat face 142 at the rear end thereof extending at a relatively blunt angle with reference to the axis of the mechanism. The shoes D are surrounded by a wedge ring F' having three circumferentially spaced flat faces at the front side thereof, one of which is shown in Fig. 4 and is indicated at 143. The faces 143 are inclined similarly to the faces 140 of the wedge shoes D' and are adapted to co-operate therewith. The ring F' is also provided with three circumferentially spaced, inner wedge faces at the rear end thereof, one of which is shown at 144 in Fig. 4. The ring F' is further provided with a flange 145 similar to the flange 45 of the ring F of the preferred form of the invention, and is spaced from the rear wall of the front follower for a similar reason. A wedge block E' having the flat rear face 146 and a pair of rearwardly diverging wedge faces 147 and 148 at its front end is interposed between the rear end of each shoe D and a spring follower ring M' directly engaged by the front end of the spring resistance. The wedge faces 147 and 148 are similarly inclined to and co-act with the wedge faces 142 and 144 respectively of the shoes D and the ring F, and the flat face 146 thereof bears on the spring follower ring.

The operation of the device shown in Fig. 4, is as follows, assuming a compression stroke in the mechanism. As the follower A' moves inwardly, the wedge shoes D' will be forced inwardly and at the same time spread apart due to the taper of the post C', a wedging action will be first set up between the keen faces 140 and 143 of the shoes D' and the ring F', forcing the shoes into intimate frictional contact with the V-shaped friction surfaces 136 of the post C, there being only slight slippage between the faces 132 and 141 of the follower A' and the shoes D' at this time due to the lateral movement of the shoes. During the further inward movement of the follower A' the shoes D' will further be spread apart due to the taper of the post C', thereby effecting a differential action, the faces 141, 140 and 142 of the shoes D' slipping on the faces 132, 143 and 147 of the follower A', ring F' and wedge blocks E', and the faces 144 of the ring F' slipping on the faces 148 of the wedge blocks E' thereby effecting an increase in length of the wedge friction system and an additional compression of the spring resistance. Upon removal of the compression force, the follower A' will drop away from the wedge shoes D' and the latter will be forced outwardly with reference to the ring by the wedges E', whereupon, all the parts will be restored to normal position by the action of the spring resistance.

Referring to the modification illustrated in Fig. 5, the mechanism shown therein, comprises, a follower $A^2$; a post $C^2$; three wedge friction shoes $D^2$; three wedge blocks $E^2$; and a wedge ring $F^2$.

The post $C^2$ is in all respects similar to the post C of the preferred form, being provided with three arms 235 and three rearwardly diverging V-shaped friction surfaces 236, with which three shoes $D^2$ co-act. Each of the shoes $D^2$ is provided with an outer wedge face 210 at the front end thereof disposed at a relatively keen angle with reference to the longitudinal axis of the mechanism and co-operating with a similarly disposed wedge face 211 on the inner side of the adjacent block $E^2$. Each shoe is provided with a side face 212 to the rear of the face 210 co-acting with one of three flat wedge faces 213 on the ring $F^2$, the faces 212 and 213 being disposed at relatively blunt angles with reference to the longitudinal axis of the mechanism. Each face 213 of the ring F² also co-acts with a similarly inclined face 214 at the rear end of the block E². The follower A² is in all respects similar to the follower A of the preferred form, with the exception that the same is provided with three interior wedge faces 232, disposed at a more obtuse angle with reference to the longitudinal axis of the mechanism than the corresponding faces of the follower A. Each of the faces 232 is adapted to co-act with a similarly inclined face 233 at the outer end of one of the blocks E², it being understood that there are three blocks E², co-acting with the three shoes D² and the follower A². Rearward movement of the ring F² is directly opposed by a spring resistance similar to the spring H.

In the operation of the device shown in Fig. 5, as the follower A² moves inwardly, the initial action is a wedging between the faces 210 of the shoes D² and the faces 211 of the wedge blocks E², forcing the shoes against the friction surfaces 236 on the post C², there being substantially no relative movement between the faces 232 and 233 of the follower and the wedge blocks E² and between the faces 213 and 214 of the ring F² and the blocks E² at this time. This action results in a slight spacing of the faces 213 of the ring with reference to the faces 212 of the shoes D², rearward movement of the shoes D² being resisted, due to the friction between the same and the tapered post C². During the further movement of the follower A², the shoes D² will be moved rearwardly therewith on the post C² and a slight gradual spreading apart of the shoes will be effected due to the taper of the post C². A differential action is thus produced, the faces 233 and 214 of the wedge blocks slipping on the faces 232 and 213 of the follower A² and the ring F², thereby producing an additional rearward movement of the shoes D² and the ring F². Upon removal of the compression force, the follower will drop away from the block E², and the ring F² under the influence of the spring will force the blocks E² forwardly until the shoes D² are picked up by the ring, whereupon all the parts will be restored to normal position.

Referring to the modification illustrated in Fig. 6, the mechanism shown therein comprises a follower A³; a post C³; three wedge friction shoes D³; three wedge blocks E³; and a wedge ring F³.

The post C³ is in all respects similar to the post C of the preferred form, being provided with three arms 335 and three V-shaped rearwardly diverging friction surfaces 336 with which the shoes D³ co-act. Each of the shoes D³ is provided with a flat outer side face 310 slightly inclined rearwardly and toward the axis of the mechanism. The three shoes D³ are also provided with laterally projecting lugs 311, each adapted to engage loosely within a corresponding recess 312 in the ring F³, so arranged that limited rearward movement of the ring relatively of the shoes is permitted. The wedge blocks E³ are each provided with a relatively keen wedge face 332 at the front end thereof, adapted to co-act with one of the three faces 333 on the shell A³ and a slightly blunter face 334 at the rear end thereof adapted to co-act with a similarly inclined face 335 at the front end of the ring F³, there being three such faces on the ring, one for each block. Rearward movement of the ring F³ is directly resisted by a spring similar to the spring H of the preferred form.

In the operation of the device shown in Figure 6, as the follower A³ moves inwardly an initial wedging action is set up between the wedge faces 332 of the wedge blocks and the wedge faces 333 of the follower, pressing the wedge blocks E³ tightly against the shoes and the shoes against the friction surfaces of the post. During this initial action there is substantially no relative movement between the faces 334 and 335 of the blocks and ring, the ring being forced rearwardly a slight distance with respect to the shoes D³. During the further movement of the follower A³ the wedges E³ will slide rearwardly and inwardly on the surfaces 310 of the shoes D³, a slippage occurring between the faces 332 and 334 of the blocks E³ and the faces 333 and 335 of the follower A³ and the ring F³ respectively, forcing the ring F³ rearwardly until the front walls of the recesses 312 therein engage the lugs 311 on the shoes D³, whereupon the latter will be moved rearwardly therewith. During the rearward movement of the shoes, the same will be spread apart gradually due to the taper of the post, effecting a differential action, the faces 332 and 334 of the wedge blocks E³ slipping on the faces 333 and 335 of the follower and ring respectively, producing an additional rearward movement of the shoes D³ and the ring F³, further compressing the spring. Upon removal of the compression force, due to the bluntness of the angle included between the wedge faces of the follower, the latter will drop away from the wedge blocks and the blocks, due to the bluntness of the faces in contact with the ring, will be readily forced outwardly relative to the shoes, relieving the pressure thereon, until the latter are picked up by the ring, permitting the spring to return all of the parts to normal position.

Referring to the modification illustrated in Figure 7, the mechanism shown therein comprises, a follower A⁴; a post C⁴; three wedge friction shoes D⁴; three wedge blocks E⁴; three auxiliary wedge blocks N⁴; and a spring follower ring P⁴.

The post C⁴ is in all respects similar to the post C of the preferred form being provided with three arms 435 and three rearwardly diverging V-shaped friction surfaces 436 with which the shoes D⁴ coact. Each of the shoes D⁴ is provided with a lateral projection 410 having a front wedge face 411 and a rear wedge face 412 adapted to coact respectively with a rear wedge face 413 on the inner side of one of the wedge blocks E⁴ and a front wedge face 414 on the inner side of one of the auxiliary wedge blocks N⁴, the faces 411 and 413 extending at a relatively keen angle and the faces 412 and 414 extending at a relatively blunt angle with reference to the longitudinal axis of the mechanism. The outer side of each block E⁴ is also cut away at the rear end thereof to provide a flat face 419 correspondingly inclined to and adapted to coact with the face 414 of the corresponding block N⁴. Each of the blocks E⁴ is provided with a flat front face 420 adapted to coact with one of three flat vertical faces 421 on the inner side of the follower A⁴. Each of the wedge blocks N⁴ is provided with a relatively keen angle face 415 at the front end thereof adapted to coact with one of three corresponding inclined inner faces 416 at the rear end of the follower A⁴. Each of the blocks N⁴ is further provided with a slightly beveled rear face 417 adapted to abut one of three correspondingly beveled faces 418 on the spring follower ring P⁴. Rearward movement of the ring P⁴ is directly resisted by a spring similarly arranged to the spring H of the preferred form of the invention.

The operation of the device shown in Figure 7 is as follows, assuming a compression stroke of the mechanism. As the follower A⁴ moves inwardly, a wedging action will be set up between the faces 413 and 411 of the blocks E⁴ and the shoes D⁴ and the shoes moved rearwardly on the post C⁴. During this rearward movement the shoes will be gradually spread apart due to the taper of the post C⁴ thereby setting up a differential wedge action, the faces 419 and 420 of the blocks E⁴ slipping on the faces 414 and 421 of the blocks N⁴ and the follower A⁴ respectively forcing the blocks N⁴ to slide on the flat faces 416 of the shell, and effecting a separation of the faces 414 and 412 of the shoes D⁴ and block N⁴, the rear ends of the blocks N⁴ being held in proper position during this time due to the coacting beveled faces 417 and 418 on the blocks and ring respectively. Upon removal of the compression force, due to the separation existing between the shoes D⁴ and blocks N⁴, the wedges are projected forwardly directly by the blocks N⁴, actuated by the full reactive force of the springs, thereby relieving the wedge pressure and all the parts being restored to normal position by the spring moving the ring P⁴ forwardly.

Referring to the modification illustrated in Figure 8 the mechanism shown therein, comprises, broadly, a follower A⁵; a friction post C⁵; three friction shoes D⁵; three wedge blocks E⁵; three auxiliary blocks M⁵; and a spring follower P⁵.

The post C⁵ is in all respects similar to the post C of the preferred form, being provided with three arms 535 and three rearwardly diverging V-shaped friction surfaces 536 with which the three shoes D⁵ coact. Each of the shoes D⁵ is provided with an outer wedge face 510 at the front end thereof disposed at a relatively keen angle with reference to the longitudinal axis of the mechanism and co-operating with a similarly inclined face 511 on the inner side of one of the three blocks E⁵. Each shoe is also provided with a face 512 to the rear of the face 510 cooperating with a flat wedge face 513 on one of the auxiliary wedge blocks M⁵. The faces 512 and 513 are disposed at relatively blunt angles with reference to the longitudinal axis of the mechanism. The face 513 of each of the blocks M⁵ also coacts with a similarly inclined face 514 at the rear end of one of the blocks E⁵. The side walls 530 of the follower A⁵ converge slightly rearwardly, the follower being in all other respects similar to the follower A of the preferred form. The blocks E⁵ are each provided with an outer relatively blunt wedge face 533 at the front end thereof adapted to coact with one of three similarly inclined inner wedge faces 532 of the follower. The ring P⁵ is adapted to coact with a spring similar to the spring H and is provided with three circumferentially spaced apart outer beveled faces at the front side thereof adapted to coact with similarly beveled faces on the blocks M⁵.

The operation of the device shown in Figure 8 is as follows, assuming a compression stroke of the mechanism. As the follower A⁵ moves inwardly a wedging action will be set up between the faces 510 and 511 of the shoes D⁵ and the blocks E⁵ and the shoes will be moved rearwardly on the post C⁵. During this rearward movement the shoes will be gradually spread apart due to the taper of the post C⁵, thereby setting up a differential wedging action, the faces 533 of the blocks E⁵ slipping on the faces 532 of the follower and the faces 514 of the blocks E⁵ slipping on the faces 513 of the blocks M⁵ thereby effecting a rearward movement of the shoes D⁵ with reference to the follower, and a rearward movement of the blocks M⁵ with reference to the shoes D⁵ as well as a gradually increasing clearance between the faces 513 of the blocks M⁵ and the faces 512 of the shoes D⁵. A further rearward movement of the blocks $M^5$ will also be effected due to the converging faces 530 of the follower. The beveled contacting faces on the ring $P^5$ and the blocks $M^5$ serve to maintain the blocks in contact with the converging faces 530 of the follower.

Upon removal of the compression force, on account of the clearance existing between shoes $D^5$ and wedges $M^5$, the entire outward force of the spring is exerted against the wedging system in such manner as to break up the close contact between the various members of same, allowing these members to readily be moved outwardly, thus relieving the frictional resistance on the shoes, the latter being picked up and moved outwardly when contact is restored between same and the wedges $M^5$, all the parts being thus returned to their normal positions.

Referring to the modification illustrated in Figure 9 the mechanism shown therein comprises, a follower $A^6$; a friction post $C^6$; three friction shoes $D^6$; three wedge blocks $E^6$; and a follower ring $P^6$.

The follower $A^6$ is somewhat similar to the follower A of the form of invention shown in Figures 1 and 2, with the exception that the former is provided with additional wedge faces at the inner end portion thereof. The follower $A^6$ is provided with three walls 630 and three wedge faces 632 extending at a relatively keen angle to the axis of the mechanism, and three additional wedge faces 640 at the inner end portion thereof extending at a relatively keen angle to said axis. The post $C^6$ is in all respects similar to the post C, being provided with three arms 635 and three rearwardly diverging V-shaped friction surfaces 636.

The friction shoes $D^6$ cooperate with the friction surfaces 636, each shoe being provided with a front wedge face 633 coacting with one of the wedge faces 632 of the follower and a rear wedge face 634 coacting with a correspondingly inclined wedge face 645 on the front end of the corresponding block $E^6$ and extending at a relatively blunt angle with reference to the axis of the mechanism. Each of the blocks $E^6$ is provided with a flat outer side face corresponding in inclination to and adapted to slide on one of the faces 640 of the follower. The ring $P^6$ surrounds the rear ends of the shoes $D^6$ and is provided with three circumferentially spaced, beveled faces 637 on the front side thereof adapted to coact with correspondingly beveled faces on the rear ends of the blocks $E^6$ to hold the latter in contact with the flat inner surfaces of the follower. Rearward movement of the ring $P^6$ is resisted by a spring similar to the spring H.

The operation of the device shown in Figure 9 is as follows, assuming a compression stroke of the mechanism. As the follower $A^6$ moves inwardly a wedging action is set up between the faces 632 of the follower and the faces 633 of the shoes and between the faces 634 of the shoes and the faces 645 of the blocks $E^6$, pressing the shoes against the post $C^6$ and the blocks $E^6$ against the faces 640 of the follower. During further movement of the follower $A^6$ the shoes $D^6$ will be moved rearwardly on the post $C^6$ and spread apart slightly due to the taper of the post, the spreading of the shoes effecting a differential wedge action, the faces 633 and 634 of the shoes $D^6$ slipping on the surfaces 632 and 645 of the follower $A^6$ and the blocks $E^6$ respectviely and the blocks $E^6$ slipping on the faces 640 of the follower. The shoes $D^6$ are thus moved rearwardly with reference to the follower and the blocks moved rearwardly with reference to the shoes. Upon removal of the compression force, the reactive force of the spring is exerted outwardly against the ring $P^6$, restoring all the parts to normal postion, the angularity of the co-acting wedge faces of the follower $A^6$ and the shoes $D^6$ and wedge blocks $F^6$ being such that the follower $A^6$ will readily drop away.

Referring to the modification illustrated in Figure 10, the mechanism shown comprises, a follower $A^7$; a friction post $C^7$; three friction shoes $D^7$; three wedge blocks $E^7$; three auxiliary wedge blocks $R^7$; and a spring follower ring $P^7$.

The post $C^7$ is in all respects similar to the post C of the preferred form, being provided with three arms 735 and three rearwardly-diverging V-shaped friction surfaces 736 adapted to slidingly receive the shoes $D^7$. Each of the shoes $D^7$ is provided with a laterally projecting lug 740 at the rear end thereof provided with a flat front face 741 extending at a relatively blunt angle with reference to the longitudinal axis of the mechanism. Each of the shoes $D^7$ is also provided with a flat longitudinally extending side face 742 slightly inclined rearwardly and outwardly with reference to the corresponding face 736 of the post $C^7$. The faces 741 are adapted to co-act with blunt inner faces 744 on the auxiliary blocks $R^7$ and the faces 742 are adapted to coact with correspondingly inclined faces 743 on the wedge blocks $E^7$. The follower $A^7$ has the side walls thereof provided with three front and three rear inner wedge faces 745 and 746 respectively, all disposed at relatively keen angles with reference to the axis of the mechanism. Each of the faces 746 is adapted to coact with a similarly inclined outer face 748 at the front end of one of the blocks $R^7$. The wedge blocks $E^7$ are each provided with a front wedging face 747 adapted to abut one of the faces 745 of the follower $A^7$ and with a rear outer face 749 adapted to abut a short inner wedge face 750 disposed at a relatively blunt angle with reference to the axis of the mechanism, at the front end of the adjacent block R⁷. The ring T⁷ bears directly on the rear faces of the lugs 740 and rearward movement thereof is resisted by a spring similar to the spring H of the preferred form.

The operation of the device shown in Figure 10 is as follows. As the follower A⁷ moves inwardly a wedging action is set up between the wedge faces 745 and 747 of the follower A⁷ and the blocks E⁷, thereby pressing the shoes D⁷ against the post C⁷. As the follower A⁷ moves inwardly, the shoes D⁷ will be forced gradually outwardly due to the taper of the post C⁷, thus setting up a differential action in the wedge blocks E⁷, causing the latter to slip outwardly along the surfaces 745 and 747. At the same time a slippage occurs along the faces 749 and 750 of the blocks E⁷ and R⁷ respectively, thus forcing the latter rearwardly and outwardly between the faces 746 of the follower and 741 of the shoes D⁷, which are thereby carried still further rearwardly, a slippage occurring between the faces 742 and 743 of the shoes and wedges E⁷, as the wedging mechanism is thus elongated. Upon removal of the compression force the followed A⁷ will fall away from the wedges E⁷ and R⁷ thus relieving the pressure on the latter and the shoes D⁷, permitting the spring resistance to restore all the parts to normal position.

Referring to the modification illustrated in Figure 11 the mechanism shown therein comprises a follower A⁸, a friction post C⁸; three friction shoes D⁸; three wedge blocks E⁸; and wedge ring T⁸; and a spring follower ring P⁸.

The follower A⁸ and the post C⁸ are in all respects similar to the follower A and the post C of the preferred form of the invention, the follower A⁸ being provided with three longitudinal walls 830 and three interior wedge faces 832; and the post being provided with three arms 835 and three rearwardly diverging V-shaped friction surfaces 836. The shoes D⁸ are each adapted to slide on one of the surfaces 836 of the post, and each is provided with a laterally projecting lug 840 at the rear end thereof having a flat front face 841 extending at a relatively blunt angle with reference to the longitudinal axis of the mechanism. Each of the shoes D⁸ is also provided with a flat longitudinally extending side face 842 slightly inclined rearwardly with reference to the corresponding side face 836 of the post C⁸. The faces 842 are adapted to coact with flat inner side faces 843 on the blocks E⁸ and the faces 841 are adapted to coact with correspondingly inclined faces 844 on the ring T⁸. Each of the faces 832 of the follower A⁸ is adapted to coact with a similarly inclined face 833 at the front end of one of the blocks B⁸, these faces being disposed at a relatively keen angle with reference to the axis of the mechanism. The wedge blocks E⁸ are also each provided with a rear outer wedge face 845 adapted to coact with a similarly inclined face 846 at the front edge of the wedge ring T⁸, the faces 845 and 846 being inclined at relatively blunt angles with reference to the longitudinal axis of the mechanism. The wedge ring T⁸, and the blocks E⁸, as shown, are spaced from the walls 830 of the follower A⁸. The ring P⁸ bears directly on the rear faces of the lugs 840 of the shoes D⁸ and rearward movement thereof is resisted by a spring similar to the spring H shown in Figures 1 and 2.

The operation of the device shown in Figure 11 is as follows. As the follower A⁸ moves inwardly a wedging action is set up between the wedge faces 832 and 833 of the follower and the blocks E⁸ respectively thereby forcing the blocks E⁸ against the shoes D⁸ and pressing the shoes against the post C⁸. As the follower A⁸ moves inwardly, the wedge blocks E⁸ will force the wedge ring T⁸ rearwardly, the latter, in turn, through engagement with the lugs 840 on the shoes D⁸ forcing the shoes rearwardly also. As the shoes move rearwardly on the friction surfaces of the post C⁸ they will be gradually spread apart due to the taper of the post, forcing the wedge blocks E⁸ outwardly also, thereby effecting a differential wedge action, the faces 833 slipping on the faces 832 of the follower, the faces 845 slipping on the faces 846 of the ring T⁸ and the faces 841 of the shoes D⁸ slipping on the faces 844 of the ring T⁸. The shoes D⁸ will thus be forced rearwardly relatively to the follower A⁸, and the wedges E⁸, a slippage thus occurring between the faces 842 and 843 of the shoes and the blocks E⁷. Upon removal of the compression force, the follower A⁸ will drop away from the wedges E⁸ thus relieving the pressure on the latter and the shoes D⁸, permitting the spring resistance to restore all the parts to normal position.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a tapered central friction element; of a series of friction shoes co-operable with said element; a spring resistance; a plurality of wedge blocks having engagement with the shoes; and a wedge pressure transmitting means having wedging engagement with said blocks; a wedge ring co-operating with said blocks, said blocks and ring having co-acting sets of faces which are disposed at a relatively blunt non-wedging angle with reference to the longitudinal axis of the mechanism.

2. In a friction shock absorbing mechanism, the combination with front and rear followers; of a central friction post having a plurality of exterior friction surfaces diverging inwardly of the mechanism; a plurality of friction shoes, each of said shoes co-operating with one of said post friction surfaces; a spring resistance; and a wedge system co-operable with said shoes, said system including a wedge pressure transmitting member; a wedge ring and wedge blocks, said ring and block having cooperating faces disposed at a relatively blunt non-wedging angle with reference to the longitudinal axis of the mechanism.

In witness that I claim the foregoing I have hereunto subscribed my name this 22nd day of September, 1923.

STACY B. HASELTINE.